United States Patent
Lee et al.

(10) Patent No.: US 9,055,441 B2
(45) Date of Patent: Jun. 9, 2015

(54) COMMUNICATION METHOD, APPARATUS, AND SYSTEM

(71) Applicant: Samsung Electronics Co., Ltd., Suwon-si (KR)

(72) Inventors: Dong-ik Lee, Seoul (KR); Kwan-woo Song, Yongin (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 170 days.

(21) Appl. No.: 13/679,070

(22) Filed: Nov. 16, 2012

(65) Prior Publication Data
US 2013/0149966 A1 Jun. 13, 2013

(30) Foreign Application Priority Data
Dec. 13, 2011 (KR) .......................... 10-2011-0133998

(51) Int. Cl.
*H04B 7/00* (2006.01)
*H04W 12/08* (2009.01)
*H04L 29/06* (2006.01)
*H04W 4/00* (2009.01)
*H04W 12/02* (2009.01)
*H04W 84/20* (2009.01)

(52) U.S. Cl.
CPC ............. *H04W 12/08* (2013.01); *H04L 63/101* (2013.01); *H04W 4/008* (2013.01); *H04W 12/02* (2013.01); *H04W 84/20* (2013.01)

(58) Field of Classification Search
CPC ............................. H04W 84/18; H04W 4/008
USPC .................... 370/394, 230, 338; 455/41.2, 39
See application file for complete search history.

(56) References Cited

U.S. PATENT DOCUMENTS

| | | | |
|---|---|---|---|
| 7,961,661 B2 * | 6/2011 | Hargrave et al. .............. | 370/311 |
| 8,208,401 B2 * | 6/2012 | Park et al. ...................... | 370/254 |
| 8,375,207 B2 * | 2/2013 | Dangoor et al. .............. | 713/168 |
| 8,780,917 B2 * | 7/2014 | Hargrave et al. .............. | 370/394 |
| 2011/0149803 A1 | 6/2011 | McCormack et al. | |

* cited by examiner

*Primary Examiner* — Sonny Trinh
(74) *Attorney, Agent, or Firm* — Staas & Halsey LLP

(57) ABSTRACT

Provided are a communication method, apparatus, and system. The communication method comprises registering addresses of opponent devices to communicate with in advance between a ZigBee coordinator and an end device, thus preventing an unauthorized device from joining a network or avoiding unnecessary joining due to a user's mistake.

18 Claims, 5 Drawing Sheets

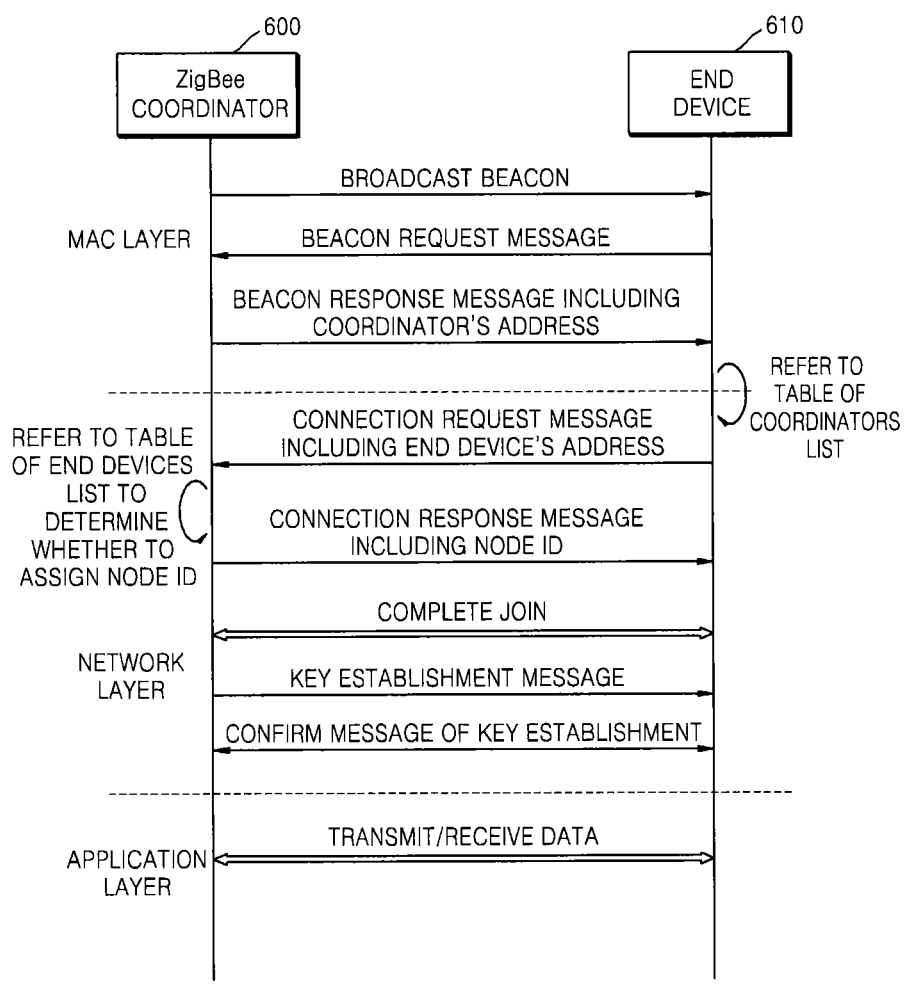

COMMUNICATION METHOD, APPARATUS, AND SYSTEM

CROSS-REFERENCE TO RELATED APPLICATIONS

This application claims the priority benefit of Korean Patent Application No. 10-2011-0133998, filed on Dec. 13, 2011, in the Korean Intellectual Property Office, the disclosure of which is incorporated herein in its entirety by reference.

BACKGROUND

1. Field

One or more embodiments relate to a communication method, apparatus, and system.

2. Description of the Related Art

ZigBee is a protocol that supports short-range communications, using IEEE 802.15.4 as a media access control (MAC) layer, and may transmit data at the rate of 250 Kbps/1 Km. The ZigBee protocol forms a variety of network topologies, connecting thousands of devices therein, and is applied in various fields due to its low power consumption.

A ZigBee network includes ZigBee devices, such as, a coordinator to coordinate the ZigBee network, full function devices (FFDs) for functioning as network routers, and reduced function devices (RFDs) to function as end devices.

Each ZigBee network is identified by network information, such as, a specific channel number assigned to a communication unit area, a personal area network (PAN) identification (ID), and a channel. The coordinator conducts a formation with a set PAN ID and channel, and configures a ZigBee network after accepting a join request from a router or an end device. Accordingly, the coordinator, the router, and the end device, all of which have the same PAN ID and channel, may start communicating with each other in a ZigBee addressing manner.

SUMMARY

Additional aspects and/or advantages will be set forth in part in the description which follows and, in part, will be apparent from the description, or may be learned by practice of the invention.

One or more embodiments provides a communication method, apparatus, and system that in ZigBee communication to prevent from joining of unauthorized devices or unnecessary devices by mistake, by registering addresses of opponent devices to communicate between a ZigBee coordinator and an end device in advance.

According to an aspect of one or more embodiments, there is provided a communication method between a ZigBee coordinator and an end device, the method including: receiving a connection request message from the end device, wherein the receiving is performed by the ZigBee coordinator; referring to a stored table of end devices and determining whether to accept the connection request from the end device, wherein the referring and determining is performed by the ZigBee coordinator; and sending the end device a connection response message including a node identification (ID), wherein the sending is performed by the ZigBee coordinator.

The determining whether to accept the connection request from the end device includes determining if address information of the end device included in the connection request message is included in the table of end devices.

The communication method may further include the ZigBee coordinator sending the end device a beacon response message including address information of the ZigBee coordinator in response to a beacon request message from the end device.

The end device may check a stored table of coordinators and determines if the address information of the ZigBee coordinator is included in the table of coordinators, and if the address information of the ZigBee is included in the table of coordinators, send the connection request message to the ZigBee coordinator.

The ZigBee coordinator may broadcast a beacon, receive a beacon request message from the end device, and send the end device a beacon response message including address information of the ZigBee coordinator in response to the beacon request message from the end device.

The receiving, the determining, and the sending may be performed in a network layer.

The communication method may further include establishing an encryption key between the ZigBee coordinator and the end device, after the sending.

According to another aspect of one or more embodiments, there is provided a communication method between a ZigBee coordinator and an end device, the method including, sending a beacon request message to the ZigBee coordinator, wherein the end device performs the sending; receiving a beacon response message including the ZigBee coordinator's address from the ZigBee coordinator; referring to a stored table of coordinators and determining whether to request the coordinator to allow the end device to join a network; sending the ZigBee coordinator a connection request message including address information of the end device; and receiving a connection response message including a node identification (ID) from the ZigBee coordinator.

The determining whether to request the ZigBee coordinator to allow the end device to join the network includes determining if the address information of the ZigBee coordinator is included in the table of coordinators.

The ZigBee coordinator may determine whether to accept the connection request from the end device by determining if address information of the end device included in the connection request message is included in the table of end devices.

The ZigBee coordinator may send the connection response message including the node ID to the end device if the address information of the end device is included in the table of end devices.

The communication method may further include, after the receiving the connection response message, establishing an encryption key between the ZigBee coordinator and the end device.

According to another aspect of one or more embodiments, there is provided a communication apparatus to process a network join request from an end device in a ZigBee network, the communication apparatus including, a storage unit to store a table of end devices; and a controller to receive a connection request message from the end device, checking the table of end devices to determine whether to accept the connection request from the end device, and to send a connection response message including a node ID to the end device.

The controller may determine whether to accept the connection request from the end device by determining if address information of the end device included in the connection request message has a corresponding one in the table of end devices.

According to another aspect of one or more embodiments, there is provided a communication apparatus to request a ZigBee coordinator to join a network, the communication apparatus including, a storage unit to store a table of coordinators; and a controller to send the ZigBee coordinator a beacon request message, to receive a beacon response message including the ZigBee coordinator's address from the ZigBee coordinator, to check the table of coordinators to determine whether to request the ZigBee coordinator for a network join, to send a connection request message including address information of the apparatus, and to receive from the ZigBee coordinator a connection response message including a node ID.

The controller may determine whether to request the ZigBee coordinator for a network join by determining if the address information of the ZigBee coordinator is included in the table of coordinators.

According to another aspect of one or more embodiments, there is provided a ZigBee network communication method including, a ZigBee coordinator broadcasting a beacon; an end device sending the ZigBee coordinator a beacon request message; the ZigBee coordinator sending a beacon response message including address information of the ZigBee coordinator to the end device in response to the beacon request message; the end device sending a connection request message including the end device's address information to the ZigBee coordinator, if the address information of the ZigBee coordinator is included in a locally stored table of coordinators table; and the ZigBee coordinator sending a connection response message including a node ID to the end device if the address information of the end device is included in a stored table of end devices.

According to another aspect of one or more embodiments, there is provided a ZigBee network communication system including, an end device; and a ZigBee coordinator, wherein the end device sends the ZigBee coordinator a beacon request message in response to a beacon broadcasted by the ZigBee coordinator, wherein the ZigBee coordinator sends a beacon response message including address information of the ZigBee coordinator to the end device in response to the beacon request message, wherein the end device that stores a table of coordinators to join ZigBee networks, upon receiving the beacon response message including the address information of the ZigBee coordinator, checks the table of coordinators to determine whether to request the ZigBee coordinator for a network join, and then sends a connection request message including address information of the end device to the ZigBee coordinator, wherein the ZigBee coordinator that stores a table of end devices, determines whether to accept the connection request from the end device by checking if the address information of the end device included in the connection request message is included in the table of end devices, and if the address information of the end device is included, then sends a connection response message including a node ID to the end device.

According to another aspect of one or more embodiments, there is provided at least one non-transitory computer readable medium storing computer readable instructions to implement methods of one or more embodiments

BRIEF DESCRIPTION OF THE DRAWINGS

The above and other features and advantages of one or more embodiments will become more apparent by describing in detail exemplary embodiments thereof with reference to the attached drawings in which:

FIG. 6 illustrates a join process between a ZigBee coordinator and an end device, according to another embodiment.

DETAILED DESCRIPTION

The invention now will be described more fully hereinafter with reference to the accompanying drawings, in which illustrative embodiments are shown. This invention may, however, be embodied in many different forms and should not be construed as limited to embodiments set forth herein; rather, these embodiments are provided so that this disclosure will be thorough and complete, and will fully convey the scope of the invention to those of ordinary skill in the art. Like numbers refer to like elements throughout. Descriptions of some well-known technologies that possibly obscure the invention will be omitted.

It will be understood that although the terms first and second are used herein to describe various elements, these elements should not be limited by these terms. These terms are only used to distinguish one element from another element. Thus, a first element discussed below could be termed a second element, and similarly, a second element may be termed a first element without departing from the teachings of this disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The invention now will be described more fully hereinafter with reference to the accompanying drawings. Like numerals refer to like elements throughout.

Figure 1:
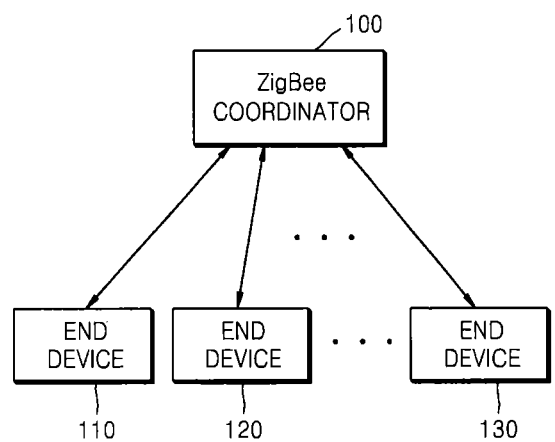
FIG. 1 is a schematic diagram of a communication system in a ZigBee network, according to an embodiment.

FIG. 1 is a schematic diagram of a communication system in a ZigBee network, according to an embodiment.

Referring to FIG. 1, a ZigBee coordinator 100 and a plurality of end devices 110-130 communicate with the ZigBee coordinator 100 in a ZigBee network.

The ZigBee network includes the ZigBee coordinator 100 to coordinate the ZigBee network and the end devices 110-130, and may further include a router (not shown) to perform a routing function.

The ZigBee coordinator 100 forms the ZigBee network identified with an automatically or manually established channel and a personal area network (PAN) identification (ID), and processes network information, such as, device information about the end devices 110-130, routing information, channel and PAN IDs, etc.

The ZigBee coordinator 100 forms and maintains the ZigBee network with a first channel number and a PAN ID, manages end devices 110-130 that attempt to join in the ZigBee network, recognizes which devices are interconnected so as to monitor and manage the ZigBee network, and allows the interconnected devices to transmit messages therebetween. Also, the ZigBee coordinator 100 assigns the end devices 110-130 2-byte node addresses for communications at the network layer, and performs a collection function of obtaining information about services supported by respective end devices 110-130.

In the beginning of ZigBee communications, the end devices 110-130 look for a channel number and a PAD ID available to be connected, and proceed with a network join process with the ZigBee coordinator 100 for data communications that formed the ZigBee network with the channel number and the PAD ID. In this process, in order to be authorized to use the ZigBee network, the end devices 110-130 are provided 2-byte network addresses by the coordinator 100.

The ZigBee coordinator 100 stores a table of end devices, and determines if end device's address information included in a connection request from the end device is included in the table of end devices by comparing the end device's address information with the table of the end devices. If the end device's address information is included in the table of end devices, the ZigBee coordinator 100 approves the connection request from the end device and sends the end device a connection response message including a node ID.

End devices each stores a table of coordinators to join in ZigBee networks, and on receiving from the ZigBee coordinator 100 a beacon response message including an address of the ZigBee coordinator 100, checks the table of coordinators to determine whether to request the ZigBee coordinator 100 for authorization to join the associated ZigBee network to which the ZigBee coordinator 100 belongs. If the ZigBee coordinator's address is found in the table of coordinators, the end device 110 sends the connection request message to the ZigBee coordinator 100.

Figure 2:
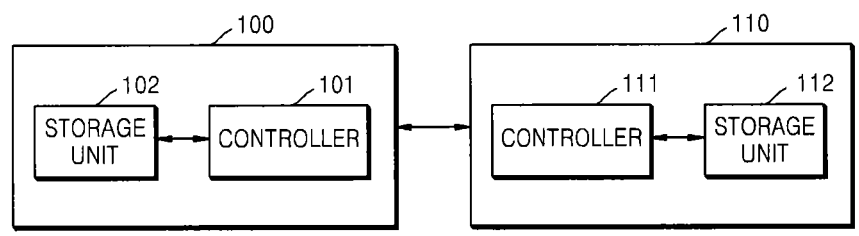
FIG. 2 is a schematic configuration for explaining a ZigBee coordinator and an end device.

A more detailed description of the ZigBee coordinator 100 and the end device (110 to 130) will be provided with reference to FIG. 2.

Referring to FIG. 2, the ZigBee coordinator 100 includes a controller 101 and a storage unit 102. The storage unit 102 stores the table of end devices. In other words, an end device, e.g., the end device 110 that needs to join the ZigBee coordinator 100, registers itself in advance in a table for registration and management of address information, such as, the table of end devices. Here, the table may be implemented in the form of a mapping table for the ZigBee coordinator 100 to perform straightforward look-up and registration at a local software level. Here, the table of end devices may be configured as Table 1 below.

TABLE 1

| IEEE Address | Node Address | Accept | Device Name |
|---|---|---|---|
| 00:12:34:56:78:9A:CD:EF | 0x1234 | 0 | Washing machine |
| 00:12:34:56:78:9A:CD:E0 | 0x5678 | 0 | Refrigerator |
| 00:12:34:56:78:9A:CD:E1 | 0x9ABC | 0 | Air conditioner |
| ... | ... | ... | ... |

The controller 101 receives from the end device 110 the connection request message, and determines whether to accept the connection request from the end device 110 by referring to the table of end devices. For example, referring to Table 1, if the controller 101 receives from one of the end devices, for example, a washing machine, the connection request message including its address 00:12:34:56:78:9A:CD:EF, the controller 101 approves the connection request because the table has the same address and then transmits to the end device 110, i.e., the washing machine, a response message including a node ID.

Referring again to FIG. 2, the end device 110 includes a controller 111 and a storage unit 112. The storage unit 112 stores the table of coordinators for a network joining process. Before ZigBee communication, the end device 110 registers in advance an IEEE address of a corresponding coordinator to communicate in the table of coordinators.

Here, the table of coordinators may be implemented in the form of a mapping table for the end device 110 to perform straightforward look-up and registration at a local software level. Here, the table of coordinators may be configured as Table 2 below.

TABLE 2

| IEEE Address | Join | Device Name |
|---|---|---|
| 00:12:34:56:78:9A:CD:EF | 0 | Coordinator |
| 00:12:34:56:78:9A:CD:E0 | 0 | Backup Coordinator |
| ... | ... | ... |

The controller 111 transmits a beacon request message to the ZigBee coordinator 100, and receives from the ZigBee coordinator 100 a beacon response message including an address of the ZigBee coordinator 100, e.g. 00:12:34:56:78:9A:CD:EF. The controller 111 checks the table of coordinators, such as shown in Table 2, to determine if the received address of the ZigBee coordinator 100 is included in the table by comparing the address of the ZigBee coordinator 100 with the table of coordinators. The controller 111 checks the table of coordinators and identifies that the address information contained in the received beacon response message corresponds to a coordinator that is to be involved in this network join process. Then, the controller 111 determines to join the ZigBee network, transmits the connection request message including its own address information to the ZigBee coordinator 100, and in response, receives a connection response message including the node ID from the ZigBee coordinator 100.

Figure 3:
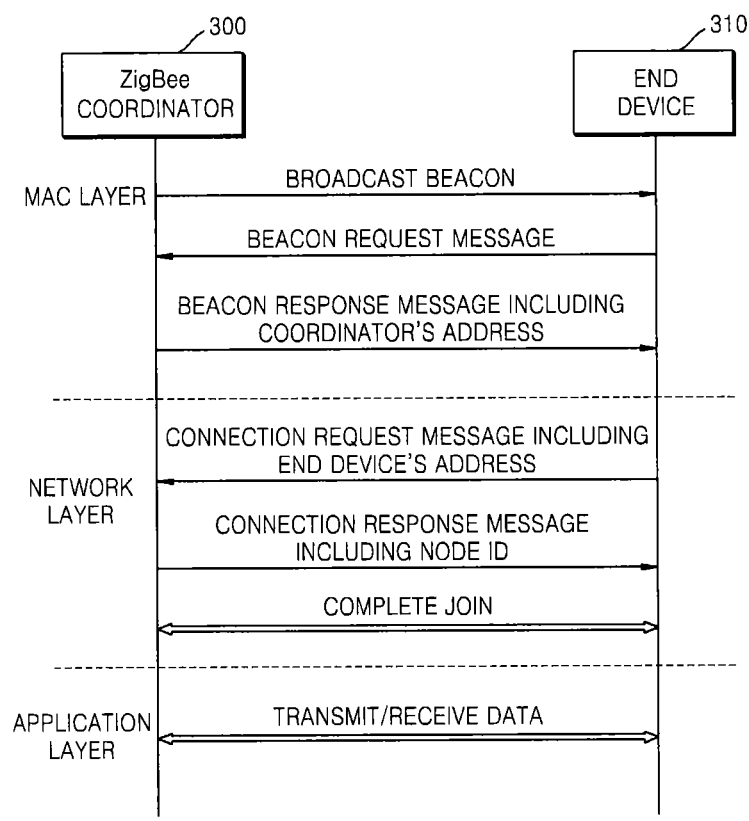
FIG. 3 illustrates an example of a join process between a ZigBee coordinator and an end device in a conventional method.
Figure 4:
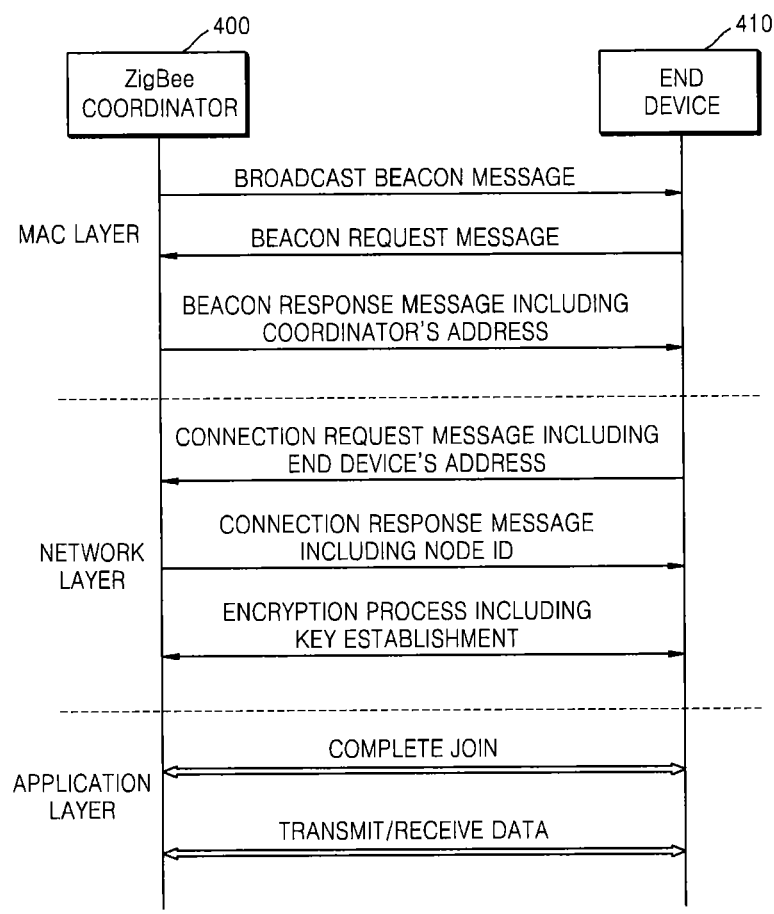
FIG. 4 illustrates another example of the join process between a ZigBee coordinator and an end device in the conventional method.

FIGS. 3 and 4 illustrate diagrams for explaining join processes between a ZigBee coordinator 300 and an end device 310 in a conventional manner.

During a conventional ZigBee connection or join process, when there is no security option applied to a corresponding ZigBee network, it is difficult for the ZigBee coordinator 300 to determine whether an end device that requests to join the ZigBee network is an authorized device. Accordingly, in order to determine whether the end device is authorized, the security option should be employed or an additional protocol should be defined to provide the ZigBee coordinator 300 with additional information of the end device 310 and have an identification process performed between the two.

Referring to FIG. 3, a join process between the end device 310 and the ZigBee coordinator 300 is shown in the conventional ZigBee communication where no security option is applied. The ZigBee coordinator 300 broadcasts a beacon in a media access control (MAC) communication manner defined in IEEE 802.15.4. The end device 310 transmits a beacon request message to the ZigBee coordinator 300, and in response, the ZigBee coordinator 300 transmits a beacon response message including the ZigBee Coordinator's address. Here, the beacon is a special message, which is allowed in a specific ZigBee network topology, for activating a client device, i.e., an end device.

Upon receiving the beacon response message including the ZigBee coordinator's address, the end device 310 transmits a connection request message including its own address information to the ZigBee coordinator 300, and in response, receives a connection response message including the node ID from the ZigBee coordinator 300, to complete the join process. This join process is performed on the network layer, and thereafter, data transmission/reception may be conducted between the ZigBee coordinator 300 and the end device 310. As illustrated, after being assigned just the node ID, it is possible for the end device 310 to join the communication of the ZigBee network on the upper layer. This may cause a problem in that an unauthorized end device can join in the ZigBee network right after obtaining a channel PAN ID.

As illustrated in FIG. 3, for the join process between a ZigBee coordinator and an end device, if there is no security option applied to the join process, it is hard for the ZigBee coordinator to determine which ones from among the end devices requesting to join an established ZigBee network with a corresponding channel and PAN ID, should be allowed. Furthermore, in a case of a dynamic join process of the ZigBee coordinator, i.e., where the end device boots-up and automatically sends the ZigBee coordinator a join request and then the ZigBee coordinator automatically responds to the join request, since there is no basis to determine whether the end device is authorized or not, an unnecessary end device may join the ZigBee network.

Referring to FIG. 4, in ZigBee communication, a join process between an end device and a ZigBee coordinator is shown where a security option is applied. The ZigBee coordinator 400 broadcasts a beacon in a MAC communication method defined in IEEE 802.15.4. The end device 410 transmits a beacon request message to the ZigBee coordinator 400, and in response, the ZigBee coordinator 400 transmits a beacon response message including the ZigBee Coordinator's address. Upon receiving the beacon response message including the ZigBee coordinator's address, the end device 410 transmits a connection request message including its own address information to the ZigBee coordinator 400, and in response, receives a connection response message including the node ID from the ZigBee coordinator 400. However, in this case, communications on the upper layer of the end device 410 is not possible only with the assigned node ID, and so an additional encryption process pre-established between the ZigBee coordinator 400 and the end device 410 needs to be performed. In other words, data transmission/reception is possible only after completion of encryption key establishment. Thus, there might be a confirmation and verification overhead in the upper layer to filter an authorized end device. The ZigBee coordinator 400 finally determines whether to accept the joining of the end device 410 during a key search process after the encryption process.

As illustrated in FIG. 4, in order to prevent the unauthorized end device connecting or joining in the ZigBee network, users need to use security keys after manually registering them with the ZigBee coordinator 400, or after the network connection is completed, the upper layer defines a protocol to perform an additional mutual identification process. In the case of additionally performing the encryption process, it is burdensome to separately create and label an encryption key after chipsets have been yielded, and defining and using the protocol in the upper layer for the mutual identification may cause a compatibility issue to arise.

Figure 5:
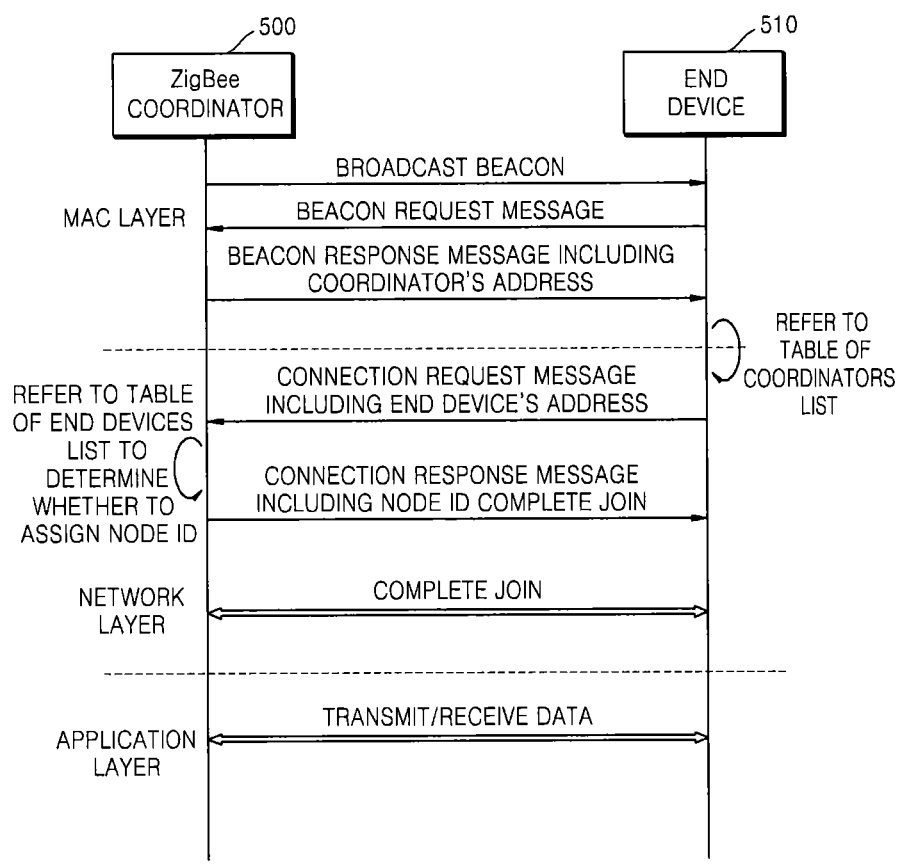
FIG. 5 illustrates a join process between a ZigBee coordinator and an end device, according to an embodiment.

FIG. 5 illustrates a join process between a ZigBee coordinator and an end device, according to an embodiment;

Referring to FIG. 5, the ZigBee coordinator 500 broadcasts a beacon in the MAC communication method defined in IEEE 802.15.4. The end device 510 transmits a beacon request message to the ZigBee coordinator 500, and in response, the ZigBee coordinator 500 transmits a beacon response message including the ZigBee coordinator's (500) address. Here, the beacon is a special message, which is allowed in a specific network topology for activating a client device, i.e., an end device. The end device 510 that receives the ZigBee coordinator's (500) address information from the ZigBee coordinator 500 checks a stored table of coordinators to determine if the address information is in the table. The end device 510 keeps the table of coordinators in a non-volatile memory, and checks the table in the beginning of the network join process, to determine whether to attempt to join the network. As shown in Table 2, the end device 510 determines if a coordinator that corresponds to the received address information is the coordinator to which the end device 510 is to send a join request. If it is the coordinator to which the end device 510 is to send a join request, the end device 510 sends the ZigBee coordinator 500 a connection request message including address information of the end device 510.

The ZigBee coordinator 500 checks the stored table of end devices to determine whether to accept the join request from the end device 510. As shown in Table 1, the ZigBee coordinator 500 determines if the end device that corresponds to the received address information is a device that is pre-defined to be allowed to join the network. The ZigBee coordinator 500 keeps the table of end devices including information about end devices allowed to join the network, and checks the table to determine whether to accept joining the network every time the join request is received. If the device is pre-defined to get allowance to join the network, the ZigBee coordinator 500 sends a connection response message including the node ID to the end device 510. The ZigBee coordinator 500 should check the table of end devices before assigning the node ID to the end device and determines whether to accept the join request, and the end device 510 checks the table of coordinators before sending the request message to the ZigBee coordinator 500 and determines whether to request to join the network. In this way, the join process may be completed on the network layer. Here, it has been described that the ZigBee coordinator 500 and the end device 510 check whether to request and accept the request, respectively, but it is not limited thereto, i.e., for example, only one of the ZigBee coordinator 500 and the end device 510 may perform both operations.

In an embodiment, the ZigBee coordinator plays a role of forming and managing a network while the end device requests the ZigBee coordinator to allow the end device to join in the network in the beginning of ZigBee communication, wherein the ZigBee coordinator configures a specific channel and a PAN ID in advance and informs the end device of the channel and the PAN ID through network broadcasting or in response to a beacon request from the end device. Here, the end device manually or dynamically discovers the presence of any surrounding network and requests the ZigBee coordinator to allow the end device to join in the network. In this regard, the ZigBee coordinator accepts the request to join the network from the end device and opens a data channel for the end device only when having IEEE address information corresponding to the end device, which has been registered in advance.

Furthermore, also on the end device's side, the end device having the table of coordinators therein checks the table and determines whether to send a join request in order to prevent an unnecessary join request from being sent to the ZigBee coordinator by a user's mistake or to an unauthorized ZigBee coordinator.

FIG. 6 illustrates a join process between a ZigBee coordinator and an end device, according to another embodiment. The difference between FIGS. 5 and 6 is that FIG. 6 has an additional process of encryption, including a key establishment process after completing the network joining. The key establishment process mutually authenticates and decides an encryption policy, and the process of joining in the network according to an embodiment ends before the key establishment process.

As shown in FIG. 6, upon receiving a beacon response message including a ZigBee coordinator's address, the end device 610 checks its table of coordinators and checks if the ZigBee coordinator corresponding to the ZigBee coordinator's address is the coordinator that has been requested with respect to the network joining. If it is the coordinator to which the end device send a request to join the network, the end device 610 sends the ZigBee coordinator 600 a connection request message including address information of the end device 610.

The ZigBee coordinator 600 checks the table of end devices based on the received address information of the end device 610 and determines whether to accept the join request from the end device 610. If the end device 610 is accepted to join the network, the ZigBee coordinator 600 sends a connection response message including the node ID to the end device 610.

The above-described embodiments may be recorded in computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD-ROM disks and DVDs; magneto-optical media such as optical disks; and hardware devices that are specially configured to store and perform program instructions, such are read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate ARRAY (FPGA), which executes program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice-versa.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

One or more embodiments may be described in terms of functional block components and various processing steps. Such functional blocks may be realized by any number of hardware and/or software components configured to perform the specified functions. For example, one ore more embodiments may employ various integrated circuit components, e.g., memory elements, processing elements, logic elements, look-up tables, and the like, which may carry out a variety of functions under the control of one or more microprocessors or other control devices. Similarly, where the elements of one or more embodiments are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that are executed in one or more processors. Furthermore, one or more embodiments could employ any number of conventional techniques for electronics configuration, signal processing and/or control, data processing and the like. The words "mechanism", "element", "means", and "configuration" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. One or more embodiments is not limited to the described order of the steps. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention.

What is claimed is:

1. A communication method between a ZigBee coordinator and an end device, the method comprising:
   receiving a connection request message from the end device, wherein the receiving is performed by the ZigBee coordinator;
   checking a stored table of end devices and determining whether to accept the connection request from the end device, wherein the checking and determining is performed by the ZigBee coordinator; and
sending the end device a connection response message including a node identification (ID), wherein the sending is performed by the ZigBee coordinator,
wherein a stored table of coordinators is used by the end device to send the connection request message.

2. The communication method of claim 1, wherein the determining whether to accept the connection request from the end device comprises determining if address information of the end device included in the connection request message is included in the table of end devices.

3. The communication method of claim 1, further comprising sending the end device a beacon response message including address information of the ZigBee coordinator in response to a beacon request message from the end device by the ZigBee coordinator.

4. The communication method of claim 3, wherein the end device checks a stored table of coordinators and determines if the address information of the ZigBee coordinator is included in the table of coordinators, and if the address information is included in the table of coordinators, sends the connection request message to the ZigBee coordinator.

5. The communication method of claim 1, wherein the ZigBee coordinator broadcasts a beacon, receives a beacon request message from the end device, and sends the end device a beacon response message including address information of the ZigBee coordinator in response to the beacon request message from the end device.

6. The communication method of claim 1, wherein the receiving, the determining, and the sending are performed in a network layer.

7. The communication method of claim 1, further comprising
establishing an encryption key between the ZigBee coordinator and the end device, after the sending.

8. A communication method between a ZigBee coordinator and an end device, the method comprising,
sending a beacon request message to the ZigBee coordinator, wherein the end device performs the sending;
receiving a beacon response message including the ZigBee coordinator's address from the ZigBee coordinator;
checking a stored table of coordinators and determining whether to request the coordinator to allow the end device to join a network;
sending the ZigBee coordinator a connection request message including address information of the end device; and
receiving a connection response message including a node identification (ID) from the ZigBee coordinator when the Zigbee coordinator determines to accept connection of the end device based on a stored table of end devices.

9. The communication method of claim 8, wherein the determining whether to request the ZigBee coordinator to allow the end device to join the network comprises determining if the address information of the ZigBee coordinator is included in the table of coordinators.

10. The communication method of claim 8, wherein the ZigBee coordinator determines whether to accept the connection request from the end device by determining if address information of the end device included in the connection request message is included in the table of end devices.

11. The communication method of claim 10, wherein the ZigBee coordinator sends the connection response message including the node ID to the end device if the address information of the end device is included in the table of end devices.

12. The communication method of claim 8, further comprising,
after the receiving the connection response message, establishing an encryption key between the ZigBee coordinator and the end device.

13. A communication apparatus to process a network join request from an end device in a ZigBee network, the communication apparatus comprising,
a storage unit for storing a table of end devices; and
a controller to receive a connection request message from the end device, to check the table of end devices to determine whether to accept the connection request from the end device, and to send a connection response message including a node ID to the end device,
wherein the connection request message is sent from the end device upon referring to a stored table of coordinators.

14. The apparatus of claim 13, wherein the controller determines whether to accept the connection request from the end device by determining if address information of the end device included in the connection request message has a corresponding one in the table of end devices.

15. A communication apparatus to request a ZigBee coordinator to join a network, the communication apparatus comprising,
a storage unit for storing a table of coordinators; and
a controller to send the ZigBee coordinator a beacon request message, to receive a beacon response message including the ZigBee coordinator's address from the ZigBee coordinator, to check the table of coordinators to determine whether to request the ZigBee coordinator for a network join, to send a connection request message including address information of the apparatus, and to receive from the ZigBee coordinator a connection response message including a node ID,
wherein the Zigbee coordinator determines whether to accept send the connection response message by referring to a stored table of end devices.

16. The apparatus of claim 15, wherein the controller determines whether to request the ZigBee coordinator for a network join by determining if the address information of the ZigBee coordinator is included in the table of coordinators.

17. A ZigBee network communication method comprising,
broadcasting a beacon from a ZigBee coordinator;
sending the ZigBee coordinator a beacon request message from an end device;
sending a beacon response message including address information of the ZigBee coordinator to the end device in response to the beacon request message from the ZigBee coordinator;
sending a connection request message including the end device's address information to the ZigBee coordinator from the end device, if the address information of the ZigBee coordinator is included in a locally stored table of coordinators table; and
sending a connection response message including a node ID to the end device from the ZigBee coordinator if the address information of the end device is included in a stored table of end devices.

18. A ZigBee network communication system comprising,
an end device; and
a ZigBee coordinator,
wherein the end device sends the ZigBee coordinator a beacon request message in response to a beacon broadcasted by the ZigBee coordinator, wherein the ZigBee coordinator sends a beacon response message including address information of the ZigBee coordinator to the end device in response to the beacon request message, wherein the end device that stores a table of coordinators to join ZigBee networks, upon receiving the beacon response message including the address information of the ZigBee coordinator, checks the table of coordinators to determine whether to request the ZigBee coordinator for a network join, and then sends a connection request message including address information of the end device to the ZigBee coordinator, wherein the ZigBee coordinator that stores a table of end devices, determines whether to accept the connection request from the end device by checking if the address information of the end device included in the connection request message is included in the table of end devices, and if the address information is included in the table of the end devices, then sends a connection response message including a node ID to the end device.

* * * * *